(12) United States Patent
Wu et al.

(10) Patent No.: US 8,819,239 B2
(45) Date of Patent: Aug. 26, 2014

(54) DISTRIBUTED RESOURCE MANAGEMENT SYSTEMS AND METHODS FOR RESOURCE MANAGEMENT THEREOF

(75) Inventors: Jin-Neng Wu, Tainan (TW); Che-Wei Chang, New Taipei (TW); Kuo-Ming Huang, Tainan (TW); Yao-Hsing Ko, Tainan (TW); Yu-Chang Chao, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 161 days.

(21) Appl. No.: 13/546,605

(22) Filed: Jul. 11, 2012

(65) Prior Publication Data

US 2013/0166751 A1    Jun. 27, 2013

(30) Foreign Application Priority Data

Dec. 26, 2011   (TW) .............................. 100148541 A

(51) Int. Cl.
*G06F 15/173* (2006.01)
*G06Q 10/00* (2012.01)

(52) U.S. Cl.
USPC .......... 709/226; 709/224; 705/7.23; 705/7.25

(58) Field of Classification Search
CPC ...................................................... G06Q 10/06
See application file for complete search history.

(56) References Cited

U.S. PATENT DOCUMENTS

| | | | |
|---|---|---|---|
| 5,062,037 A | 10/1991 | Shorter et al. | |
| 5,522,070 A | 5/1996 | Sumimoto | |
| 5,680,551 A | 10/1997 | Martino, II | |
| 5,734,909 A | 3/1998 | Bennett | |
| 5,881,315 A | 3/1999 | Cohen | |
| 6,009,455 A | 12/1999 | Doyle | |
| 6,081,826 A | 6/2000 | Masuoka et al. | |
| 6,249,802 B1 | 6/2001 | Richardson et al. | |
| 6,308,163 B1 * | 10/2001 | Du et al. ...................... 705/7.25 |
| 6,480,861 B1 | 11/2002 | Kanevsky et al. | |

(Continued)

FOREIGN PATENT DOCUMENTS

| | | |
|---|---|---|
| TW | 201030531 | 8/2010 |
| TW | I338474 | 3/2011 |

OTHER PUBLICATIONS

Hsiao, et al., "Load Balance with Imperfect Information in Structured Peer-to-Peer Systems", IEEE Transactions on Parallel and Distributed Systems, vol. 22, No. 4, Apr. 2011, pp. 634-649.

(Continued)

*Primary Examiner* — Wen-Tai Lin
(74) *Attorney, Agent, or Firm* — Muncy, Geissler, Olds & Lowe, P.C.

(57) ABSTRACT

Distributed resource management systems and methods thereof are provided. Distributed resource management system at least includes resource managers (RMs) and resource consumers (RCs). RMs obtain current usage information of the resources of the distributed resource management system and generate first distributed resource graphs according to the current usage information of the resources. RMs obtain identification information of the RMs and generate second distributed resource graphs according to the identification information. RCs obtain a resource expense information regarding resource expense required by a plurality of jobs and generates third distributed resource graphs according to the resource expense information. A compound distributed resource graph (CDRG) is obtained by combining the first, second, and third distributed resource graphs and then the jobs to be performed by a corresponding amount of the resources within the distributed resource management system are determined according to the CDRG.

16 Claims, 14 Drawing Sheets

(56) References Cited

U.S. PATENT DOCUMENTS

| | | |
|---|---|---|
| 6,516,350 B1 | 2/2003 | Lumelsky et al. |
| 6,549,932 B1 | 4/2003 | McNally et al. |
| 6,633,898 B1 | 10/2003 | Seguchi et al. |
| 6,961,764 B2 | 11/2005 | Mizoguchi |
| 7,003,772 B2 | 2/2006 | Dillenberger et al. |
| 7,093,004 B2 | 8/2006 | Bernardin et al. |
| 7,111,300 B1 | 9/2006 | Salas et al. |
| 7,127,441 B2 | 10/2006 | Musman |
| 7,296,050 B2 | 11/2007 | Vicard |
| 7,379,984 B1 | 5/2008 | Green |
| 7,395,536 B2 | 7/2008 | Verbeke et al. |
| 7,454,427 B2 | 11/2008 | Jackson |
| 7,469,239 B2 | 12/2008 | Musman |
| 7,475,107 B2 | 1/2009 | Maconi et al. |
| 7,490,095 B2 | 2/2009 | Labadie et al. |
| 7,574,708 B2 | 8/2009 | Chung et al. |
| 7,596,790 B2 | 9/2009 | Moakley |
| 7,640,547 B2 | 12/2009 | Neiman et al. |
| 7,647,590 B2 | 1/2010 | Archer et al. |
| 7,694,082 B2 | 4/2010 | Golding et al. |
| 7,720,968 B2 | 5/2010 | Clarke, Jr. et al. |
| 7,730,488 B2 | 6/2010 | Ilzuka et al. |
| 7,752,311 B2 | 7/2010 | Walker et al. |
| 7,792,096 B2 | 9/2010 | Doleh et al. |
| 7,802,263 B2 | 9/2010 | Fuchs et al. |
| 7,895,317 B2 | 2/2011 | Gingell, Jr. et al. |
| 7,912,956 B1 | 3/2011 | Williams et al. |
| 7,984,433 B2 | 7/2011 | Doi et al. |
| 7,996,842 B2 | 8/2011 | Savit |
| 8,166,484 B2 * | 4/2012 | Kawato .................. 718/104 |
| 8,223,656 B2 * | 7/2012 | Rius i Riu et al. ............ 370/241 |
| 8,484,354 B2 * | 7/2013 | Schlack ....................... 709/226 |
| 2011/0106950 A1 | 5/2011 | Schlack |

OTHER PUBLICATIONS

Zhu, et al., "Efficient, Proximity-Aware Load Balancing for DHT-Based P2P Systems", IEEE Transactions on Parallel and Distributed Systems, vol. 16, No. 4, Apr. 2005, pp. 349-361.

Jiang, et al., "Contextual Resource Negotiation-Based Task Allocation and Load Balancing in Complex Software Systems", IEEE Transactions on Parallel and Distributed Systems, vol. 20, No. 5, May 2009, pp. 641-653.

Shen, et al., "Locality-Aware and Churn-Resilient Load-Balancing Algorithms in Structured Peer-to-Peer Networks", IEEE Transactions on Parallel and Distributed Systems, vol. 18, No. 6, Jun. 2007, pp. 849-862.

Liu, et al., "Agent-Based Load Balancing on Homogeneous Minigrids: Macroscopic Modeling and Characterization", IEEE Transactions on Parallel and Distributed Systems, vol. 16, No. 7, Jul. 2005, pp. 586-598.

Taiwanese Office Action dated Mar. 3, 2014, as issued in corresponding Taiwan Patent Application No. 100148541.

* cited by examiner

DISTRIBUTED RESOURCE MANAGEMENT SYSTEMS AND METHODS FOR RESOURCE MANAGEMENT THEREOF

CROSS REFERENCE TO RELATED APPLICATIONS

This Application claims priority of Taiwan Application No. 100148541, filed on Dec. 26, 2011, and the entirety of which is incorporated by reference herein.

BACKGROUND OF THE INVENTION

1. Field of the Invention

The disclosure relates generally to resource management systems and related resource management techniques, and, more particularly to distributed resource management systems capable of providing multiple distributed resource managers for resource management and distributed resource management methods using the same.

2. Description of the Related Art

Recently, with the advance of science and network development, distributed computing and processing such as scientific computing, cloud service etc, have increased, and now require large-scale distributed resource management systems for support. With the improvement of network bandwidth, territorial limitations do not exist anymore, and widespread distributed systems have been integrated. However, as the advance of technology quickly, heterogeneous in hardware efficiency for hardware purchased at different times exist, causing the increased differences in hardware equipment resources in the distributed system, and consequently, complicating the computing resource management of the distributed systems. Moreover, since territorial limitations are no longer constrained by distributed system, the affects of network and efficacy for the system become more significant, thereby increasing the resource variability and also making the system equipment status become hard to control.

Current common methods for distributed resource management fall into the full-centralized method and hierarchical method. For the full-centralized method, all information and allocation of the resources are centrally managed by a resource manager (RM), and resource information is stored in the resource tables (RTs), wherein a resource allocation principle can be determined by a system designer. Note that here is a resource agent (RA) for each resource in charge of reporting on the available resource data to the RM. When some resources is needed by a client, a request can be issued to the RM directly. These requests will be stored in sequence and queued, and a priority will be determined according to various schedules. After the request is received, the RM inquires and determines whether the request can be accepted. If accepted, the RM notifies the RA to allocate the resource out, and modifies information in the RT. Because the resource management is performed by using a single management component in a fully centralized method, scalability is very low, and capabilities are limited, to the extent that allocation and management for processing more resources may become too much to handle. In a full-centralized method, all system information is managed by one program, resulting in that all requests stay in the same queue, thereby increasing waiting time.

For the hierarchical method, resource management is performed by a different management mission at different levels. For example, taking the design of two levels as an example. In level 1, a scheduler is in charge of receiving and managing resource requests and then the received requests are put to the other level for determining whether to accept or allocate resources. In this hierarchical method, all resources are categorized or clustered in advance and managed by different RMs. However, with such a management method, although loading of the RM can be alleviated, categorization or clustering of the resources may not be balanced enough, and request frequency of each resource may also be different, such that loading differences of each RM could be very significant.

BRIEF SUMMARY OF THE INVENTION

A distributed resource management system and distributed resource management methods for management of distributed resources are provided.

In an embodiment, a distributed resource management method for managing resources of the distributed resource management system is provided, wherein the distributed resource management system at least comprises a plurality of the resource managers (RMs) and a plurality of the resource consumers (RCs). The method comprises the steps of obtaining current usage information of the resources of the distributed resource management system by the RMs, generating a first distributed resource graph according to the current usage information of the resources, obtaining identification information of the RMs, generating a second distributed resource graph according to the identification information, obtaining a resource expense information by the RCs regarding resource expenses required by a plurality of jobs; generating a third distributed resource graph according to the resource expense information, obtaining a compound distributed resource graph (CDRG) by combining the first, second, and third distributed resource graphs, and determining the jobs to be performed by a corresponding amount of the resources within the distributed resource management system according to the CDRG.

Another embodiment of the distributed resource management system for managing a plurality of distributed resources is further provided, comprising a plurality of the resource entities, a plurality of the resource managers (RMs), a plurality of the resource consumers (RCs) and a compound distributed resource graph (CDRG). The resource entities include a plurality of the resources. The RMs manage the resources of the resource entities, wherein the RMs obtain current usage information of the resources of the distributed resource management system to generate a first distributed resource graph and obtain identification information of the RMs to generate a second distributed resource graph. The RCs provide resource expense information regarding resource expenses required by a plurality of jobs to generate a third distributed resource graph. The compound distributed resource graph (CDRG) is generated by combining the first, second, and third distributed resource graphs for determining the jobs to be performed by a corresponding amount of the resources within the distributed resource management system.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention provide distributed resource management systems (DRMS) and distributed resource management methods, which are provided with multiple distributed resource managers (hereinafter referred as RMs) to manage resources, wherein each RM can automatically estimate system a resource status for dynamic design of a hash function and generate resource graphs so as to determine resource allocation by use of the resource graphs. Moreover, several distributed resource consumers can actively issue a resource request and utilize the distributed resource graphs of the invention to search for resources to find a proper resource for performing and finishing corresponding jobs. Therefore, proper resource entities can be rapidly found to accomplish the job through the distributed resource graphs when a system needs to operate some jobs.

Figure 1A:
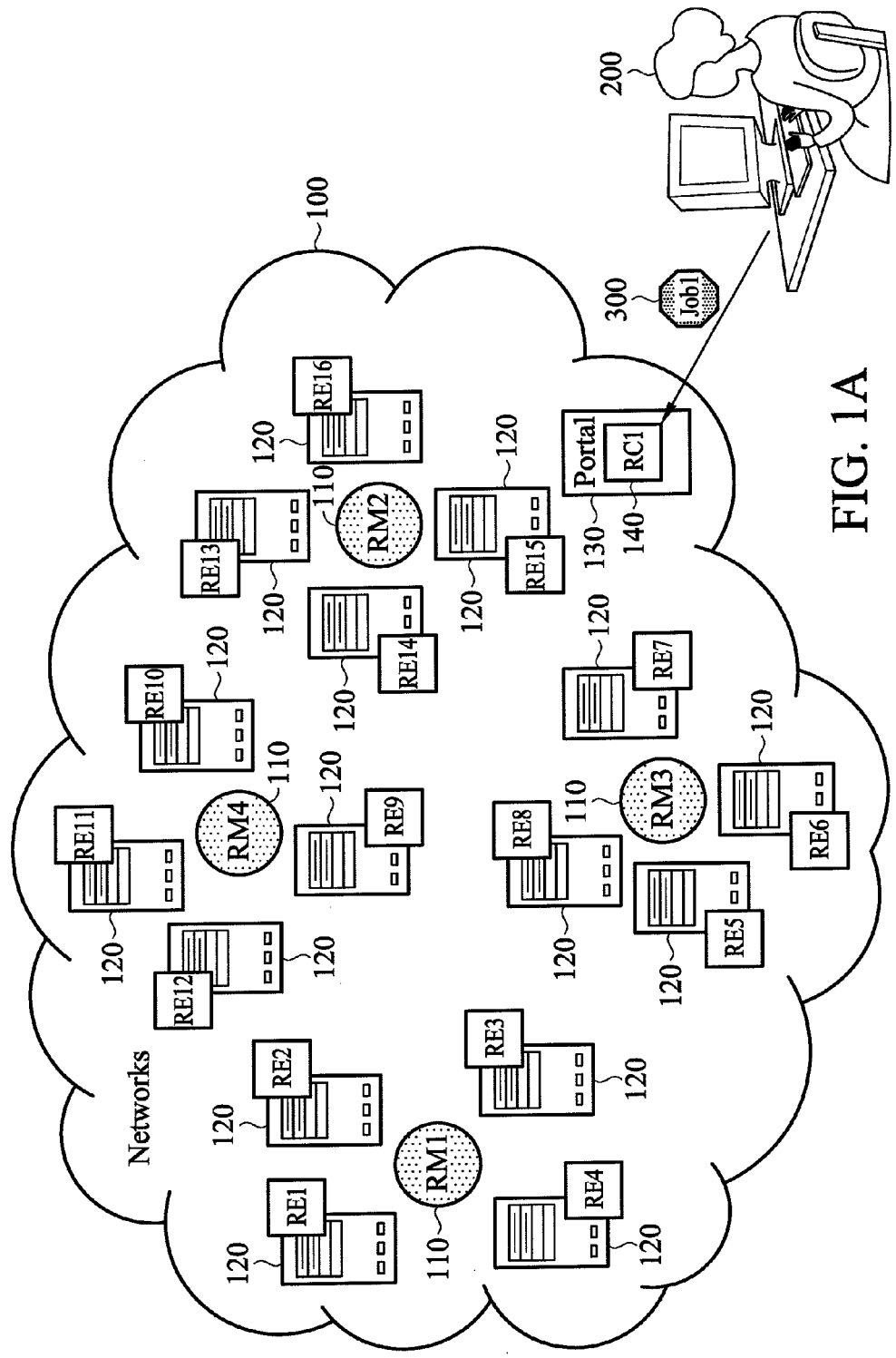
FIG. 1A is a schematic diagram illustrating an embodiment of the distributed resource management system of the invention.

FIG. 1A is a schematic diagram illustrating an embodiment of the distributed resource management system 100 of the invention. For example, the distributed resource management system 100 may be a Cloud computing system, but the invention is not limited thereto. The distributed resource management system 100 may at least comprise a plurality of host devices which are communicated via an interconnecting network such as Internet or any wireless networks, wherein, these host devices can be equipped with different identities respectively, where they at least include a host device 120 capable of providing resources, a host device 110 capable of managing resource entities, and a host device 130 capable of receiving a job request generated from a client 200. Note that, in the following embodiments, the host device 110 is referred to as a resource manager (abbr. as RM), the host device 120 is referred to a resource entity (abbr. as RE), and the host device 130 is referred to as Portal, responsible for computing/calculating required resources for job requests and generating the resource consumer (abbr. as RC), which is the component 140. For example, assume that there are 10 host devices in the distributed resource management system 100, 2 host devices may be set as RMs and other 8 host devices may be set as REs. It is to be understood that an RM may manage resources of one or a multiple of REs according to design requirements, while a resource of an RE may also be managed by one or a multiple of RMs accordingly.

Figure 1B:
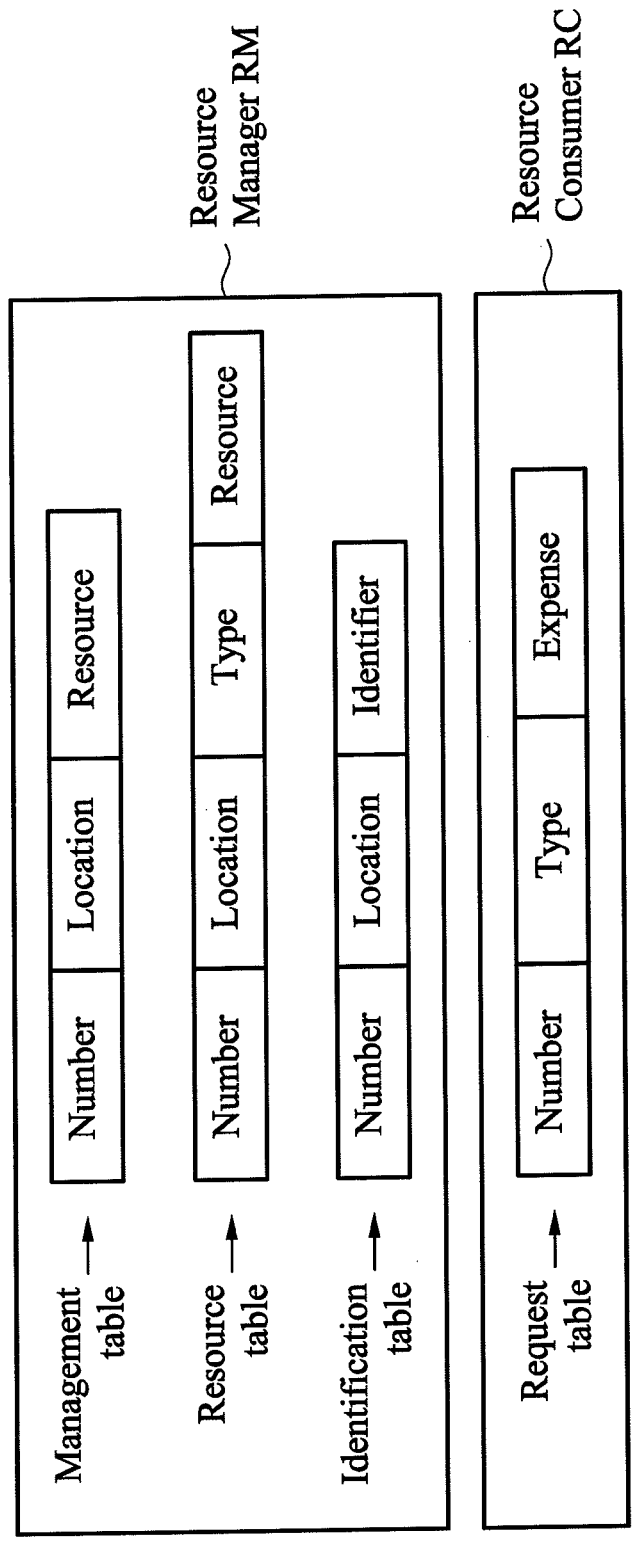
FIG. 1B is a schematic diagram illustrating an embodiment of an RM and an RC of the invention.

Each RE may provide its own software and hardware resources, including computing resource information of the central processing unit (CPU), the computing capacity information regarding memory access speed, and hard disk available space and so on, for the RM to perform management. Each RE includes a resource monitor agent for monitoring a resource usage status of the RE and feedback of the monitored resource usage status to the RM. Each RM may be treated as a process which can be performed by hardware with resources, and may be a physical device, such as a computer, or a virtual machine, such as a virtual device. As shown in FIG. 1B, the RM at least includes three components, which are a management table, an identification table and a resource table respectively, wherein the management table records resources managed by the RM, including information of series number (Number), network location of managed resources (Location), and managed resources (Managed resource) and so on. The identification table records information of the RM identification name, including the series number (Number), the network location of the RM (Location), and the RM identifier and so on. The resource table records received resource information, including the series number (Number), the network location of the resource (Location), the resource type of the virtual machine (VM) or physical device, and the available resources and so on.

The RC may be automatically generated when the portal 130 receives a job request from the client 200 for in charge the job request, including a resource request table, which records the required resource of each job (Job) 300, including information of series number (Number), the consumed resource type (Type), and the consumed expense (Expense) and so on. When any of other process requires some resources, the RC can be called to compute/calculate the required resource expense for the job 300, and search for proper resources.

Figure 2:
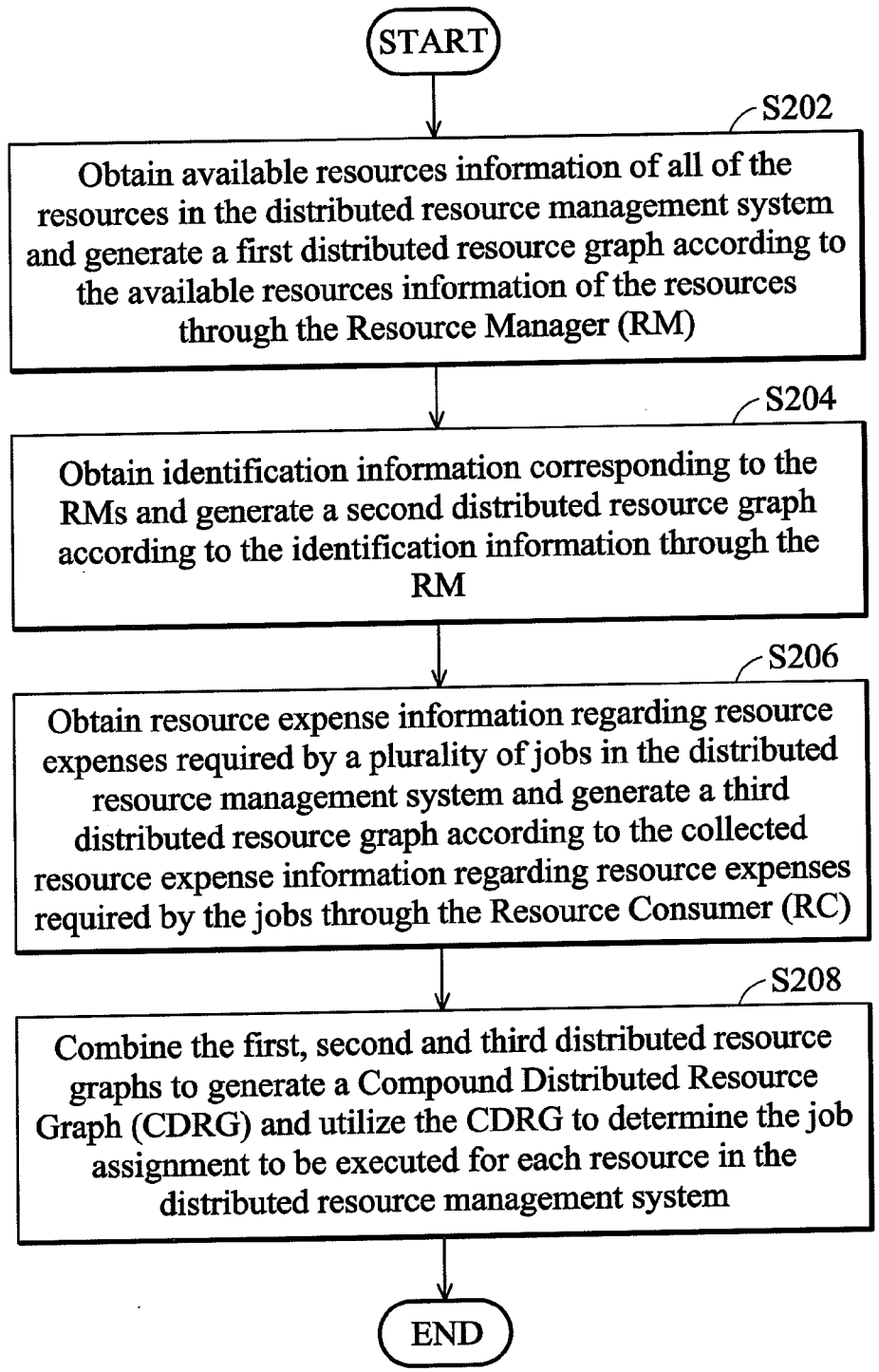
FIG. 2 is a flowchart of an embodiment of the distributed resource management method of the invention for managing a plurality of the resources of the distributed resource management system.

FIG. 2 is a flowchart of an embodiment of the distributed resource management method of the invention for managing a plurality of the resource entities of the distributed resource management system. Please refer together to FIGS. 1A and 2.

First, in step S202, available resources information of all of the resources in the distributed resource management system 100 is obtained and a first distributed resource graph is generated according to the available resources information of the resources through the RM. Then, in step S204, identification information corresponding to the RMs is obtained and a second distributed resource graph is generated according to the identification information of the RMs through the RM. To be more specific, the RM may obtain resource information and its own identification information to dynamically generate a responsive hash function and then utilize hash values calculated by the generated hash functions and specific calculation steps to generate the first and second distributed resource graphs. Detailed descriptions of the aforementioned operation are described in the following with reference to FIG. 4.

After the first and second distributed resource graphs have been generated, in step S206, resource expense information regarding resource expenses required by a plurality of jobs in the distributed resource management system 100 is further obtained and a third distributed resource graph is generated according to the resource expense information regarding resource expenses required by the jobs through the RC. To be more specific, the RC may obtain a resource expense distribution in the distributed resource management system 100 to dynamically generate a responsive hash function and then utilize hash values calculated by the generated hash function and specific calculation steps to generate the third distributed resource graph. Detailed descriptions of the aforementioned operation are described in the following with reference to FIG. 5.

Thereafter, in step S208, the first, second and third distributed resource graphs are combined to generate a Compound Distributed Resource Graph (CDRG) and the CDRG is further utilized to determine the job assignment to be executed for each resource in the distributed resource management system 100. That is, the jobs to be performed by a corresponding amount of the resources within the distributed resource management system can be determined according to the CDRG. Detailed descriptions of the generation processes of the first, second and third distributed resource graphs and the CDRG are described in the following paragraphs.

Figure 3:
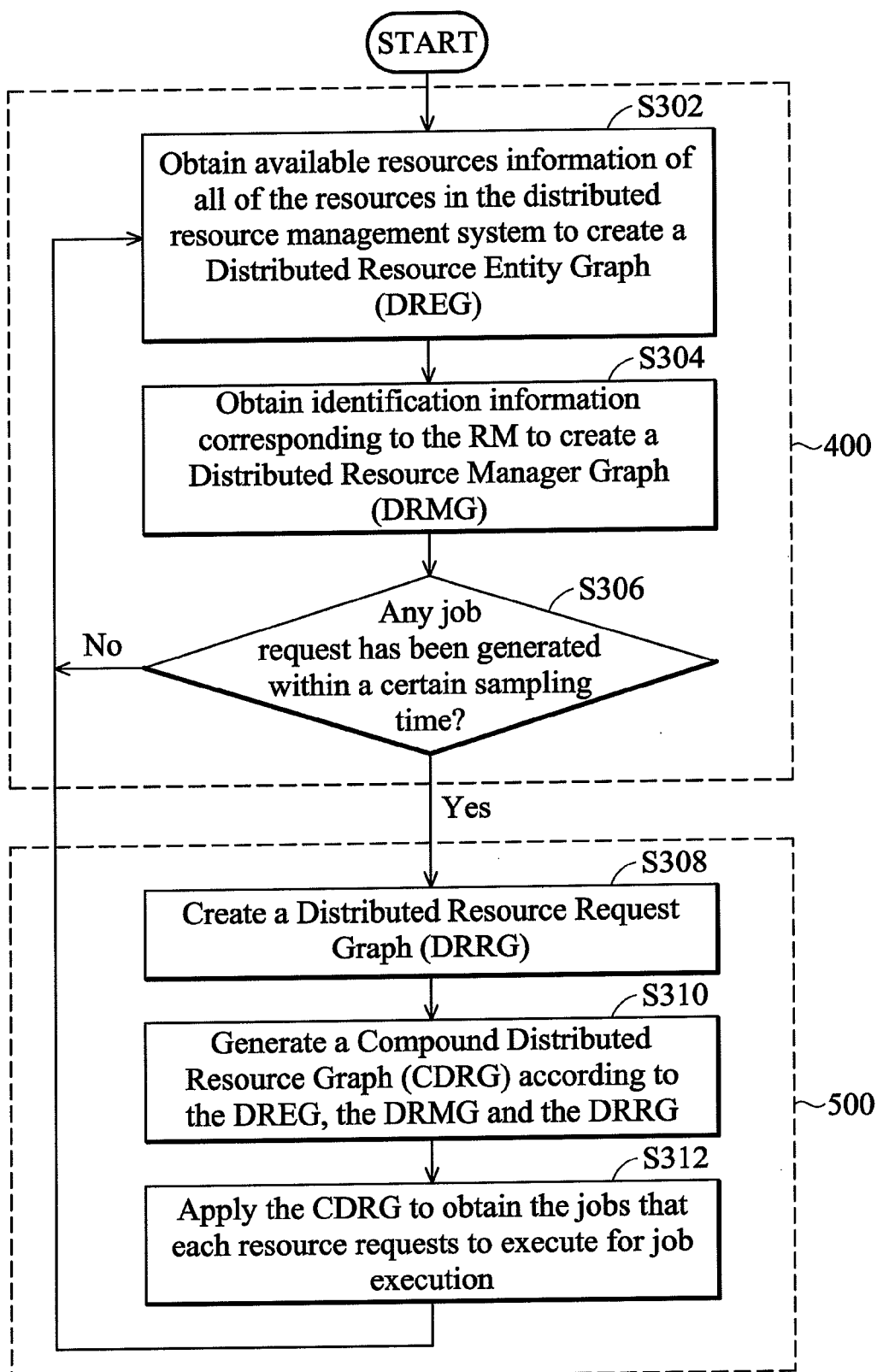
FIG. 3 is a flowchart of another embodiment of the distributed resource management method of the invention for managing a plurality of the resources of the distributed resource management system.

FIG. 3 is a flowchart of another embodiment of the distributed resource management method of the invention for managing a plurality of the resources of the distributed resource management system, divided into two processes 400 and 500 in which the process 400 comprises steps S302 to S306 and the process 500 comprises steps S308 to S312. The processes 400 and 500 will be discussed further in the following detailed description with reference to FIGS. 4 and 5.

In step S302, available resources information of all of the resources in the distributed resource management system, such as information stored in the resource table, are obtained to create a Distributed Resource Entity Graph (DREG) (the first distributed resource graph). In step S304, identification information corresponding to the RM, such as information stored in the identification table, are obtained to create a Distributed Resource Manager Graph (DRMG) (the second distributed resource graph). In step S306, it is determined whether any job request has been generated within a certain sampling time. If no job request has been generated in the certain sampling time (No in step S306), steps S302-S304 are re-performed to create or modify the DREG and the DRMG according to the available resource information and identification information of all of the resources within the distributed resource management system obtained at the sampling time point. If a job request has been generated within the certain sampling time (Yes in step S306), in step S308, a Distributed Resource Request Graph (DRRG) (the third distributed resource graph) is created according to information related to the requested jobs within the distributed resource management system 100 obtained at the sampling time point, such as information accessed from the resource request table. Thereafter, in step S310, a CDRG is generated according to the DREG, the DRMG and the DRRG. Finally, in step S312, the CDRG is applied to obtain the jobs that each resource requests to execute for job execution.

In other words, the distributed resource management system 100 may continuously create DREG and DRMG thorough the RM and if there is no job to perform and a predetermined sampling time arrived, the distributed resource management system 100 will create a new DREG and DRMG based on the latest system environment and resources. Thus, at intervals of time, the RM reobtains all information and identification information of all resources in the system 100 and registers obtained information to the DREG and the DRMG. If there is any job to be performed, the distributed resource management system 100 may reobtain required resource expense information for dispatching the jobs through the RC, and raise resource requirement through the distributed resource request graph, and then through the compound distributed resource graph to reallocate job assignments that each resource requires to be performed in system 100.

The detailed process of the RM end and the RC end and generation details of various resource graphs are described in the following paragraphs.

As aforementioned, the RM may obtain resource information within the system, access the distributed hash table, communicate with the RC and determine whether to accept the resource request. Detailed operation of the RM is described with reference to FIG. 4.

Figure 4:
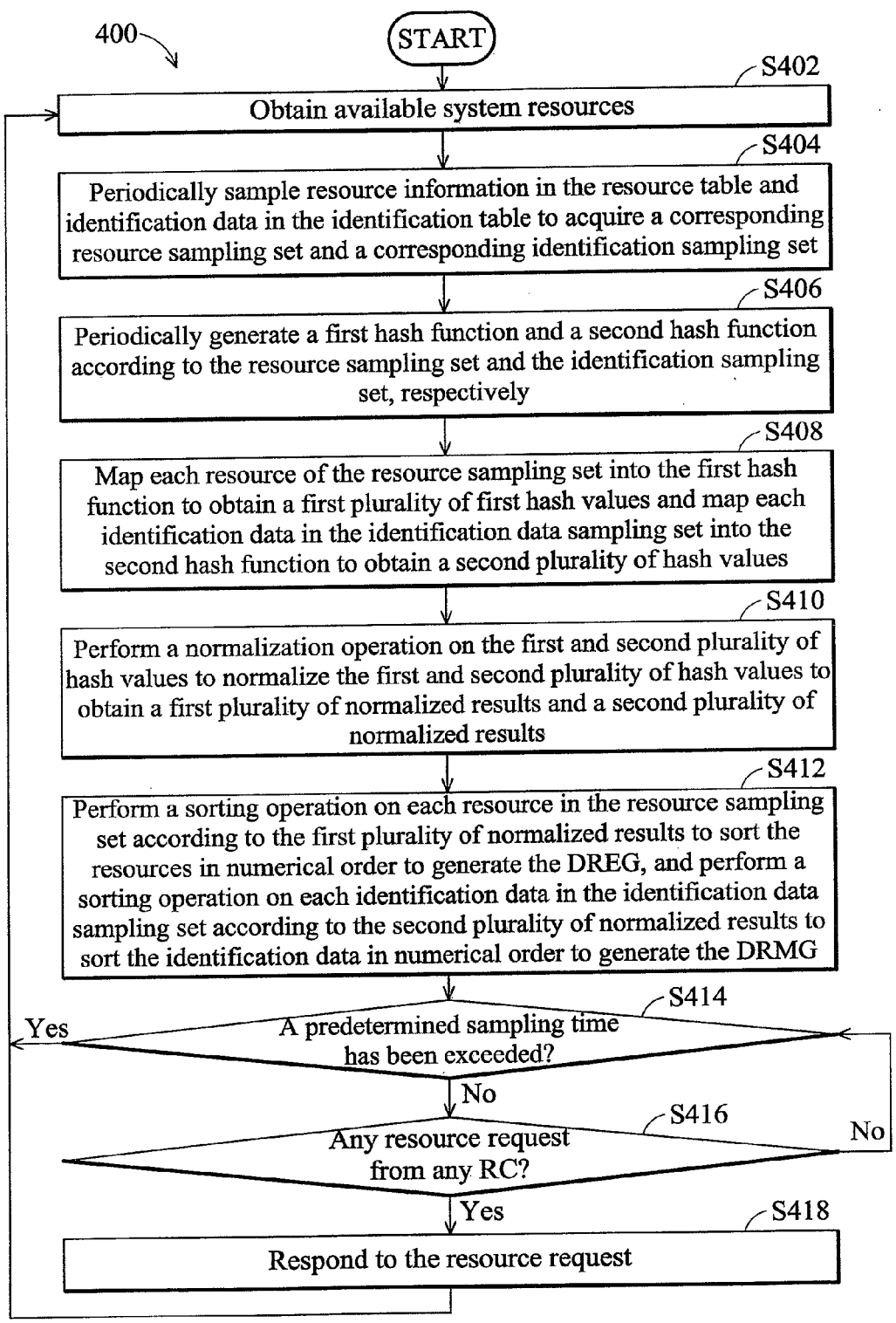
FIG. 4 is a flowchart of another embodiment of the distributed resource management method of the invention for use in an RM.

FIG. 4 is a flowchart 400 of another embodiment of the distributed resource management method of the invention for use in an RM.

First, in step S402, the RM obtains available system resources at a sampling time point. The RM may use a system resource monitoring agent to access information of those resources in the system, and the system resource information obtained by the RM at least includes, as shown in the resource table, data of series numbers, resource network locations, resource types, and available resources and so on.

In step S404, the RM periodically samples resource information in the resource table and identification data in the identification table to acquire a corresponding resource sampling set and a corresponding identification sampling set, and then, in step S406, periodically generates a first hash function and a second hash function according to the resource sampling set and the identification sampling set, respectively. In this step, the RM may obtain a resource sampling set from the resource table according to a sampling rule and then dynamically generate a Real-Time Adaptive Entity Hash Function (hereinafter referred to as RTAEHF) (i.e. the first hash function) by using the resource data in the resource sampling set. Meanwhile, the RM may also obtain an identification data sampling set from the identification table according to the sampling rule and then dynamically generates a Real-Time Adaptive Management Hash Function (hereinafter referred to as RTAMHF) (i.e. the second hash function) by use of the identification data in the identification data sampling set. Note that the design of a hash function is in accordance with user defined types, wherein resources of each type have a dedicated hash function. To obtain this function, partial information (including quantity or size) of system resources are firstly obtained and then the hash function can be obtained by calculating an estimated accumulated probability distribution function. The generation method of the hash function RTAEHF is described as following.

Assume that the resource set is defined as $R_{t_1} = \{r_1^{t_1}, r_2^{t_1}, \ldots, r_N^{t_1}\}$, where $t_1$ represents resource type and $N$ represents resource number.

$S_{R_{t_1}}(T)$ represents a resource sampling set of $R_{t_1}$ at time T, $S_{R_{t_1}}(T) = \{\tilde{r}_1^{t_1}, \tilde{r}_2^{t_1}, \ldots, \tilde{r}_n^{t_1}\}$, where $n < N$ and $S_{R_{t_1}}(T) \subseteq R_{t_1}$.

Thereafter, a resource hash function of type $t_1$ at time T can be defined as $$H_{R_{t_1}}^T(r^{t_1}) = \left(\sum_{\tilde{r}_k^{t_1} \in S_{R_{t_1}}, \tilde{r}_k^{t_1} < r^{t_1}} \tilde{r}_k^{t_1}\right) + r^{t_1},$$

where $$H_{R_{t_1}}^T(r^{t_1})$$

is the solved RTAEHF.

Next, a generation process of the hash function RTAMHF is further described.

Assume that $I_{t_1}$ is defined as the identification data set with type $t_1$, $I_{t_1} = \{i_1^{t_1}, i_2^{t_1}, \ldots, i_Q^{t_1}\}$, where Q represents the number of identification data. $S_{I_{t_1}}(T)$ is an identification data sampling set of $I_{t_1}$ at time T, and $\tilde{I}_{t_1} = \{\tilde{i}_1^{t_1}, \tilde{i}_2^{t_1}, \ldots, \tilde{i}_q^{t_1}\}$, where q<Q and $S_{I_{t_1}}(T) \subseteq I_{t_1}$.

Thereafter, the identification data hash function of type $t_1$ at time T can be defined as $$H_{I_{t_1}}^T(i^{t_1}),$$

then $$H_{I_{t_1}}^T(i^{t_1}) = \left( \sum_{\tilde{i}_k^{t_1} \in S_{I_{t_1}}, \tilde{i}_k^{t_1} < i^{t_1}} \tilde{i}_k^{t_1} \right) + i^{t_1},$$

where, $$H_{I_{t_1}}^T(i^{t_1})$$

is the solved RTAMHF.

After the hash functions RTAEHF and RTAMHF have been generated, in step S408, the RM maps each resource of the resource sampling set into the hash function RTAEHF, to calculate and obtain multiple first hash values (i.e. a first plurality of hash values), and maps each identification data in the identification data sampling set into the hash function RTAMHF to calculate and obtain multiple second hash values (i.e. a second plurality of hash values). Then, in step S410, the RM performs a normalization operation on the calculated first and second hash values to normalize the multiple first and second hash values to obtain responsive multiple first normalized results (i.e. a first plurality of normalized results) and multiple second normalized results (i.e. a second plurality of normalized results). Thereafter, in step S412, the RM performs a sorting operation on each resource in the resource sampling set according to the first normalized results to sort the resources in numerical order to generate the DREG, and performs a sorting operation on each identification data in the identification data sampling set according to the second normalized results to sort the identification data in numerical order to generate the DRMG.

After the DREG and DRMG have been generated, then, in step S414, the RM determines whether a predetermined sampling time has been exceeded. If so, the RM re-performs step S402 to reobtain resources corresponding to a next sampling time and repeats steps S404-S412 to generate a new DREG and DRMG. If the predetermined sampling time has not been exceeded (no in step S414), in step S416, the RM determines whether there is any resource request from any RC. If not, the RM re-performs step S414 until the resource request from an RC is received or the predetermined sampling time is exceeded. When determining that there is a resource request from an RC (Yes in step S416), in step S418, the RM responds to the RC that sends the resource request such that the RC can utilize the requested resource to perform a responsive job assigned via the RM. Thereafter, the RM re-performs step S402 to reobtain resources corresponding to a next sampling time.

Figure 5:
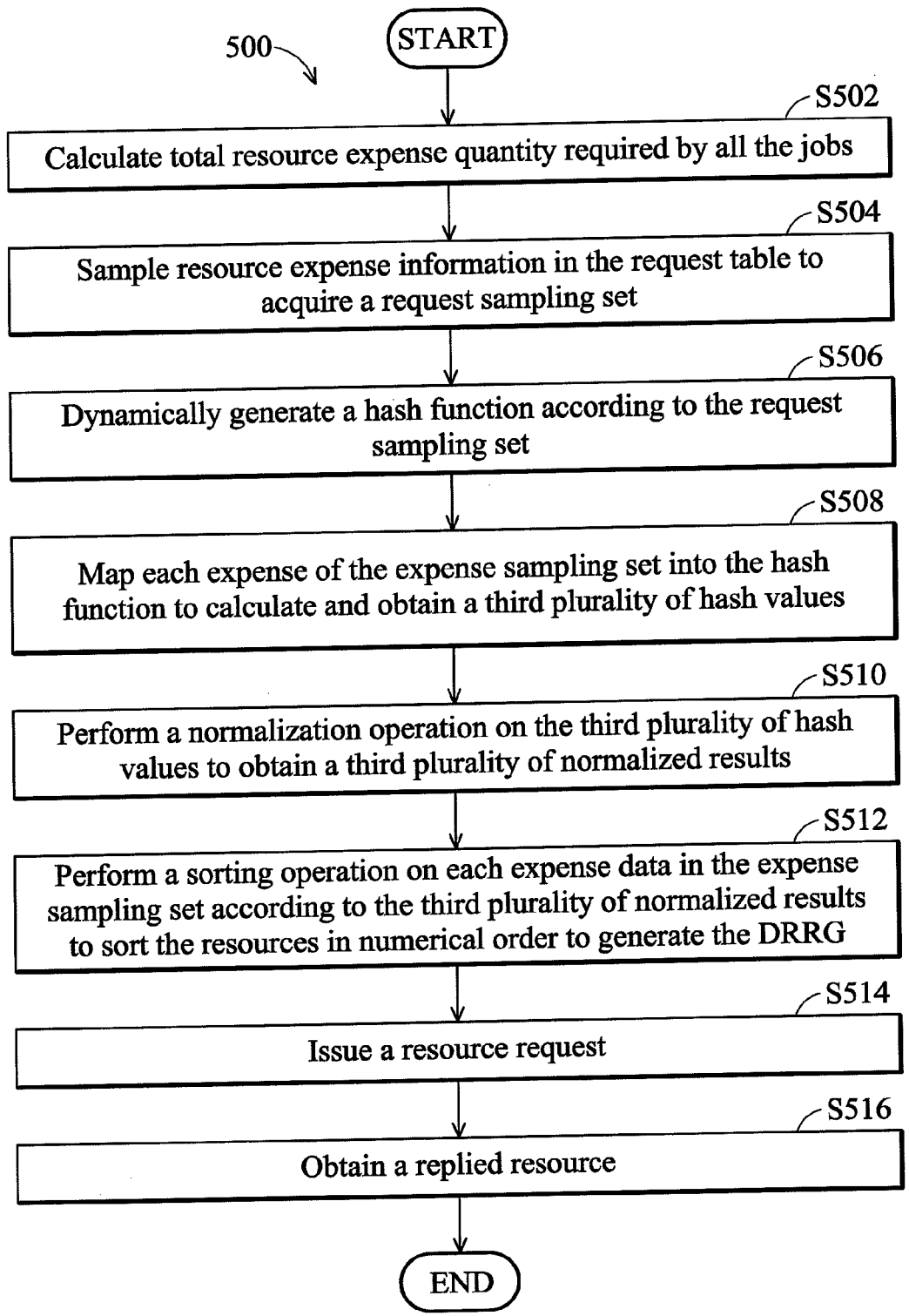
FIG. 5 is a flowchart of another embodiment of the distributed resource management method of the invention for use in an RC.

FIG. 5 is a flowchart 500 of another embodiment of the distributed resource management method of the invention for use in an RC.

In step S502, the RC calculates the total resource expense quantity required by all the jobs at the sampling time point. In step S504, the RC samples resource expense information in the request table to acquire a request sampling set and then, in step S506, generates a hash function dynamically according to the request sampling set. In this step, the RC may obtain a request sampling set from the request table according to a sampling rule and then dynamically generate a Real-Time Adaptive Request Hash Function (hereinafter referred to as RTARHF) by using the resource request data in the request sampling set. The generation method of the hash function RTARHF is described as following.

Assume that the system expense set is defined as $E_{t_1} = \{e_1^{t_1}, e_2^{t_1}, \ldots, e_M^{t_1}\}$, where $t_1$ represents resource type required to be consumed and M represents the number of expense quantity.

$S_{E_{t_1}}(T)$ represents a expense sampling set of $E_{t_1}$ at T, $S_{E_{t_1}}(T) = \{\tilde{e}_1^{t_1}, \tilde{e}_2^{t_1}, \ldots, \tilde{e}_m^{t_1}\}$, where m<M and $S_{E_{t_1}}(T) \subseteq E_{t_1}$.

Thereafter, an expense hash function of type $t_1$ at time T can be defined as $$H_{E_{t_1}}^T(e^{t_1}) = \left( \sum_{\tilde{e}_k^{t_1} \in S_{E_{t_1}}, \tilde{e}_k^{t_1} < e^{t_1}} \tilde{e}_k^{t_1} \right) + e^{t_1},$$

where $$H_{E_{t_1}}^T(e^{t_1})$$

is the solved RTARHF.

After the hash functions RTARHF has been generated, in step S508, the RC maps each expense of the expense sampling set into the hash function RTARHF, to calculate and obtain multiple hash values (i.e. a third plurality of hash values). Then, in step S510, the RC performs a normalization operation on the calculated hash values to normalize the multiple hash values to obtain responsive multiple normalized results (i.e. a third plurality of normalized results). Thereafter, in step S512, the RC performs a sorting operation on each expense data in the expense sampling set according to the normalized results to sort the resources in numerical order to generate the DRRG.

After the DRRG has been generated, in step S514, the RC issues a resource request and then, in step S514, obtains a replied resource from one or more RMs to perform the required job.

Thereafter, the DREG, the DRMG and the DRRG are combined to generate the Compound Distributed Resource Graph (CDRG).

The generation of the DREG, the DRMG, the DRRG and the CDRG are described in detail in the following.

Figure 6:
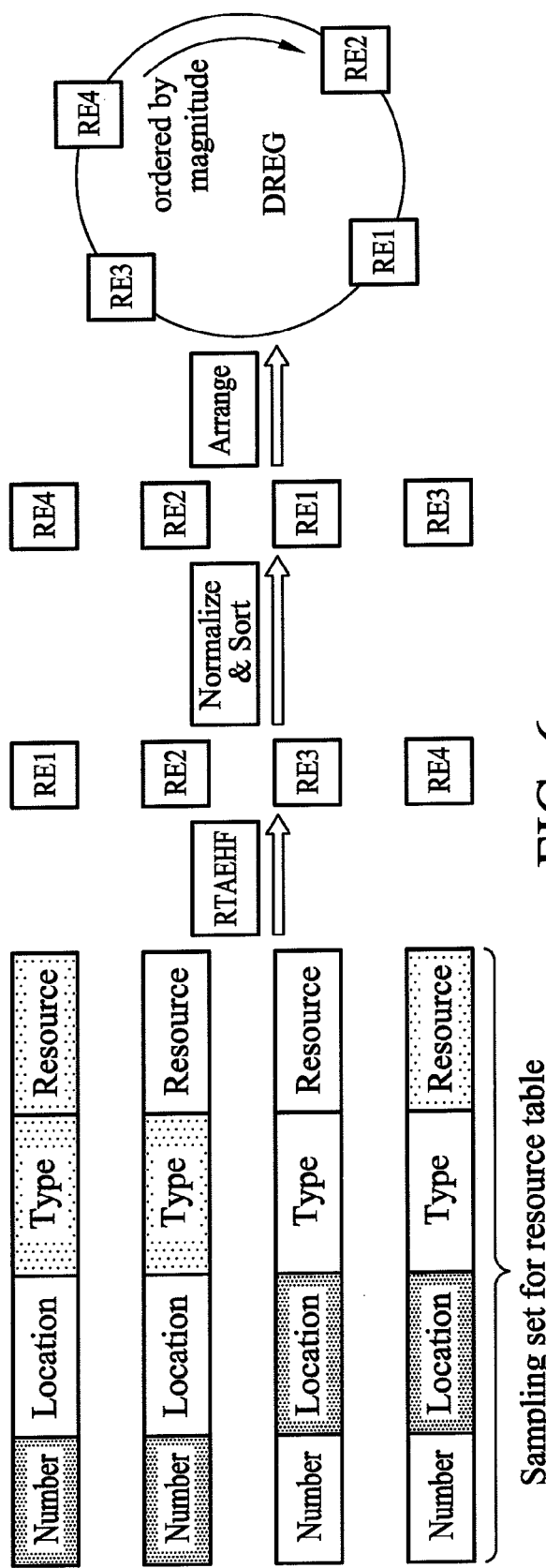
FIG. 6 is a schematic diagram illustrating an embodiment of a DREG generation of the invention.

FIG. 6 is a schematic diagram illustrating an embodiment of a DREG generation of the invention. For example, referring to FIG. 6, the DRMS 100 first samples the resource data records of the resource table to obtain the resource sampling set, next generates the first hash function RTAEHF dynamically according to the resource sampling set, then obtains a first plurality of hash values of all of the resources RE1-RE4 using the RTAEHF and lastly performs the normalization and sorting operation on the first plurality of hash values to normalize the first plurality of hash values to obtain a first plurality of normalized results and to sort the resources in the resource sampling set in numerical order based on the first plurality of normalized results to obtain the DREG. As the normalized results are, in numerical order, RE4<RE2<RE1<RE3, the resources RE1-RE4 are sorted based on the responsive normalized results and are clockwise arranged in a sequence of RE4->RE2->RE1->RE3 so as to obtain the DREG.

For example, assume that the DRMS 100 contains a resource set $R_{t_1}$={108,51,321,253,123,81,79,112,268,197, 96,55,41,63,75,222,185,5,67,153,285} and the resource sampling set for the resource set R, at time T is $S_{R_{t_1}}(T)$={RE1, RE2,RE3,RE4,RE5}={51,96,123,197,253}. Then, each of the resources RE1-RE5 of the resource sampling ser $S_{R_{t_1}}(T)$ is brought into the aforementioned hash function RTAMHF to obtain the resource values as below:

{51/(51+96+123+197+253),(51+96)/(51+96+123+
197+253), (51+96+123)/(51+96+123+197+253),
(51+96+123+197)/(51+96+123+197+253), (51+
96+123+197+253)/(51+96+123+197+253)}.

Thus, the hash values of the DREs RE1-RE5 are {070833333, 0.204166667, 0.375, 0.648611111, 1}. Thereafter, the DREG can be generated by sorting the resource entities RE1-RE5 in the resource sampling set in numerical order according to the calculated hash values corresponding thereto.

Figure 7:
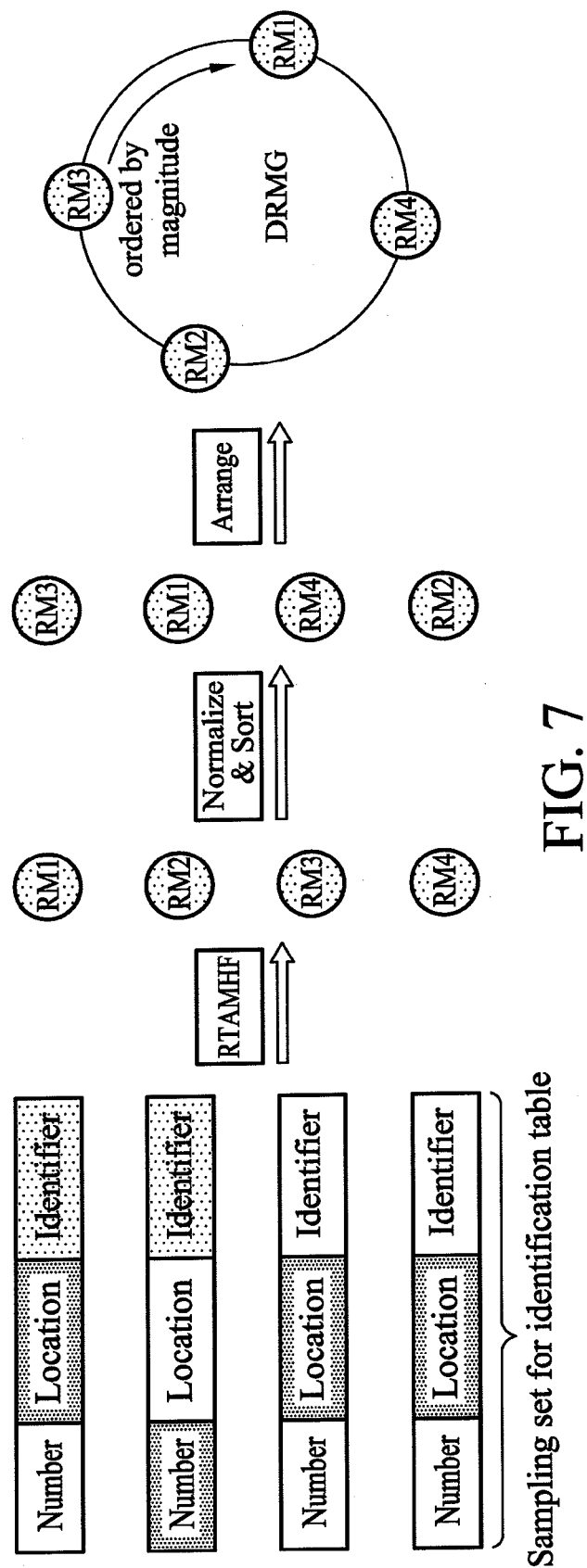
FIG. 7 is a schematic diagram illustrating an embodiment of a DRMG generation of the invention.

FIG. 7 is a schematic diagram illustrating an embodiment of a DRMG generation of the invention. The DRMS 100 first samples the identifier records of the identification table included in each RM to obtain the identification data sampling set, next generates the second hash function RTAMHF dynamically according to the identification data sampling set, then obtains a second plurality of hash values for all of the RMs using the RTAMHF, next performs the normalization and sorting operation on the second plurality of hash values to normalize the second plurality of hash values to obtain a second plurality of normalized results and to sort the RMs in numerical order based on the second plurality of normalized results to the obtain the DRMG. As the normalized results are, in numerical order, RM3<RM1<RM4<RM2, the RMs RM1-RM4 are sorted based on the responsive normalized results and are clockwise arranged in a sequence of RM3->RM1->RM4->RM2 so as to obtain the DRMG.

Figure 8:
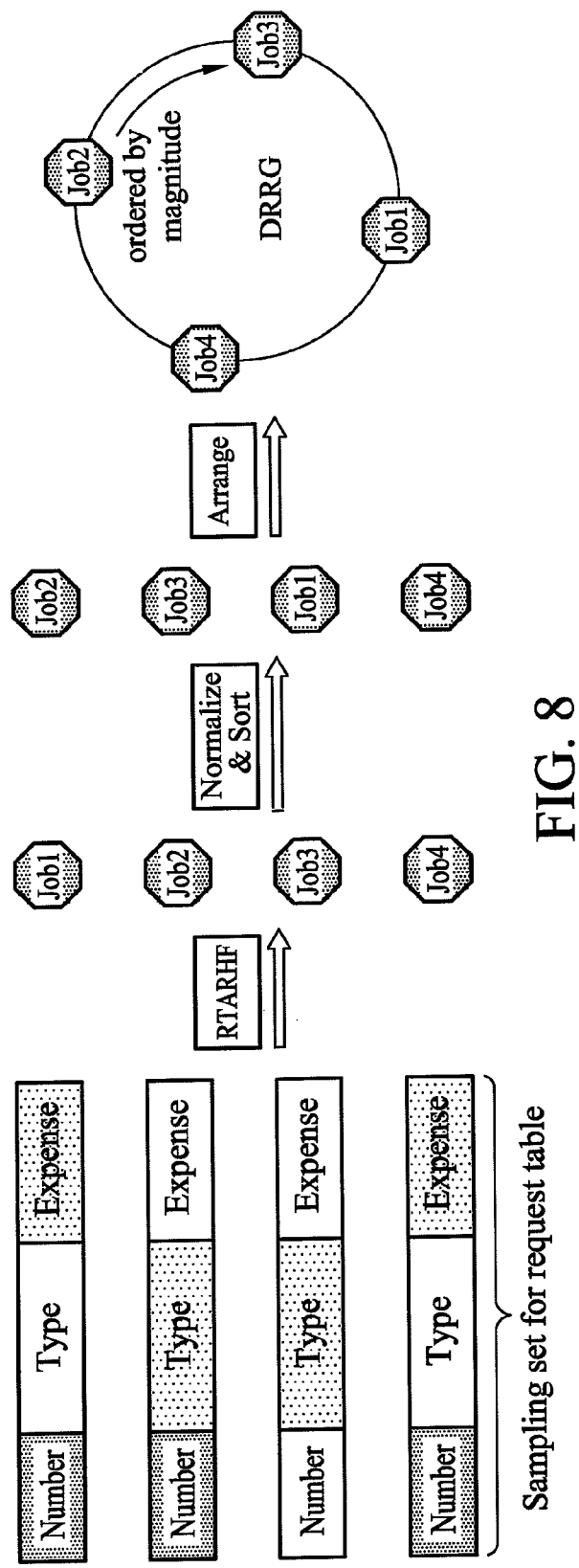
FIG. 8 is a schematic diagram illustrating an embodiment of a DRRG generation of the invention.

FIG. 8 is a schematic diagram illustrating an embodiment of a DRRG generation of the invention. The DRMS 100 first samples the request intents (RIs) of the request table to obtain the request data sampling set Job1-Job4, then generates the third hash function RTARHF dynamically according to the request data sampling set, next obtains a third plurality of hash values for the jobs Job1-Job4 using the RTARHF, and lastly performs the normalization and sorting operation on the third plurality of hash values to normalize the third plurality of hash values to obtain a third plurality of normalized results and to sort the jobs in numerical order based on the third plurality of normalized results to obtain the DRRG. As the normalized results are, in numerical order, Job2<Job3<Job1<Job4, the jobs Job1-Job4 are sorted based on the responsive normalized results and are clockwise arranged in a sequence of Job2->Job3->Job1->Job4 so as to obtain the DRRG.

Figure 9:
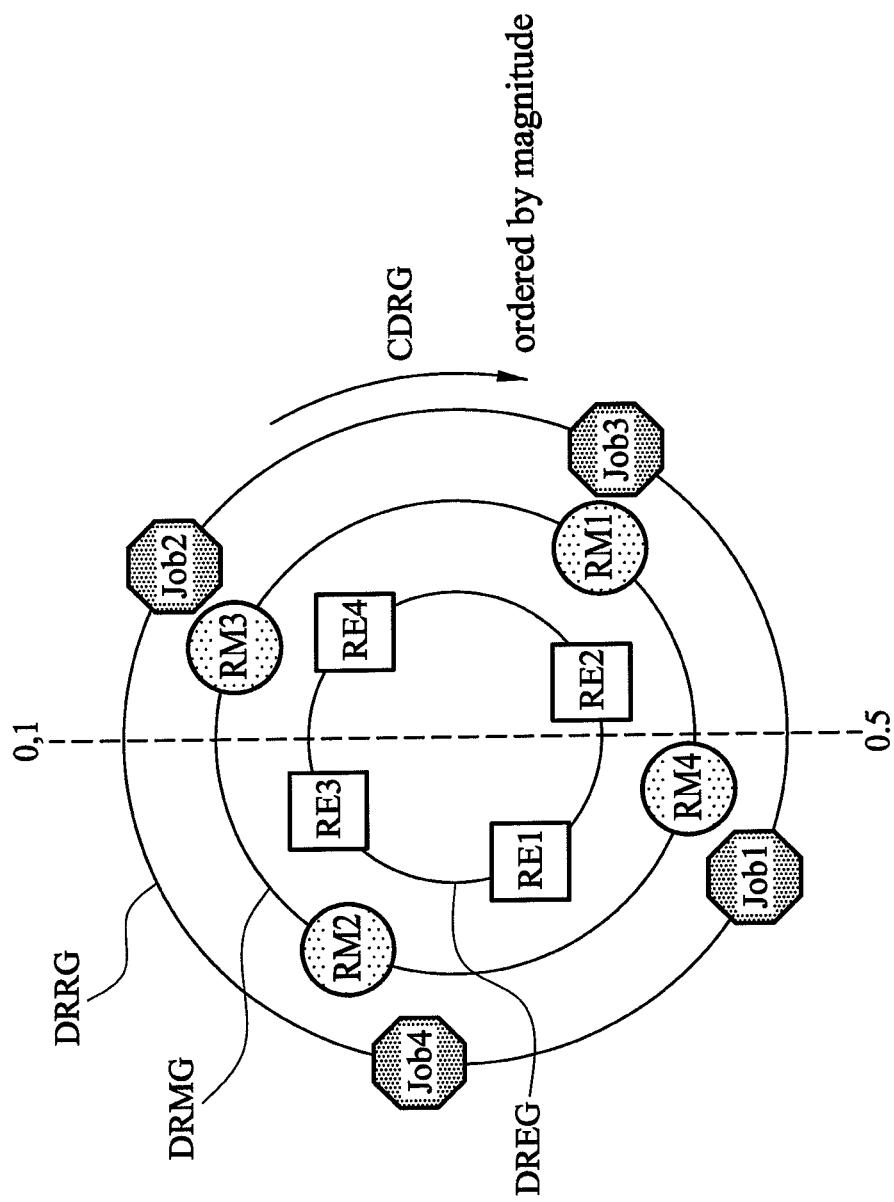
FIG. 9 is a schematic diagram illustrating an embodiment of a CDRG of the invention.

FIG. 9 is a schematic diagram illustrating an embodiment of a CDRG of the invention. As shown in FIG. 9, the CDRG is generated by arranging the DREG, the DRMG and the DRRG in a specific sequence. To be more specific, the DREG arranges the REs in numerical order and the DRMG arranges the RMs in numerical order in which the REs between two RMs can be managed by the smaller RM therebetween. The DRRG arranges the resource requests in numerical order to find the RE which has available resources larger than that for the resource request to perform the requested job.

Figure 10A:
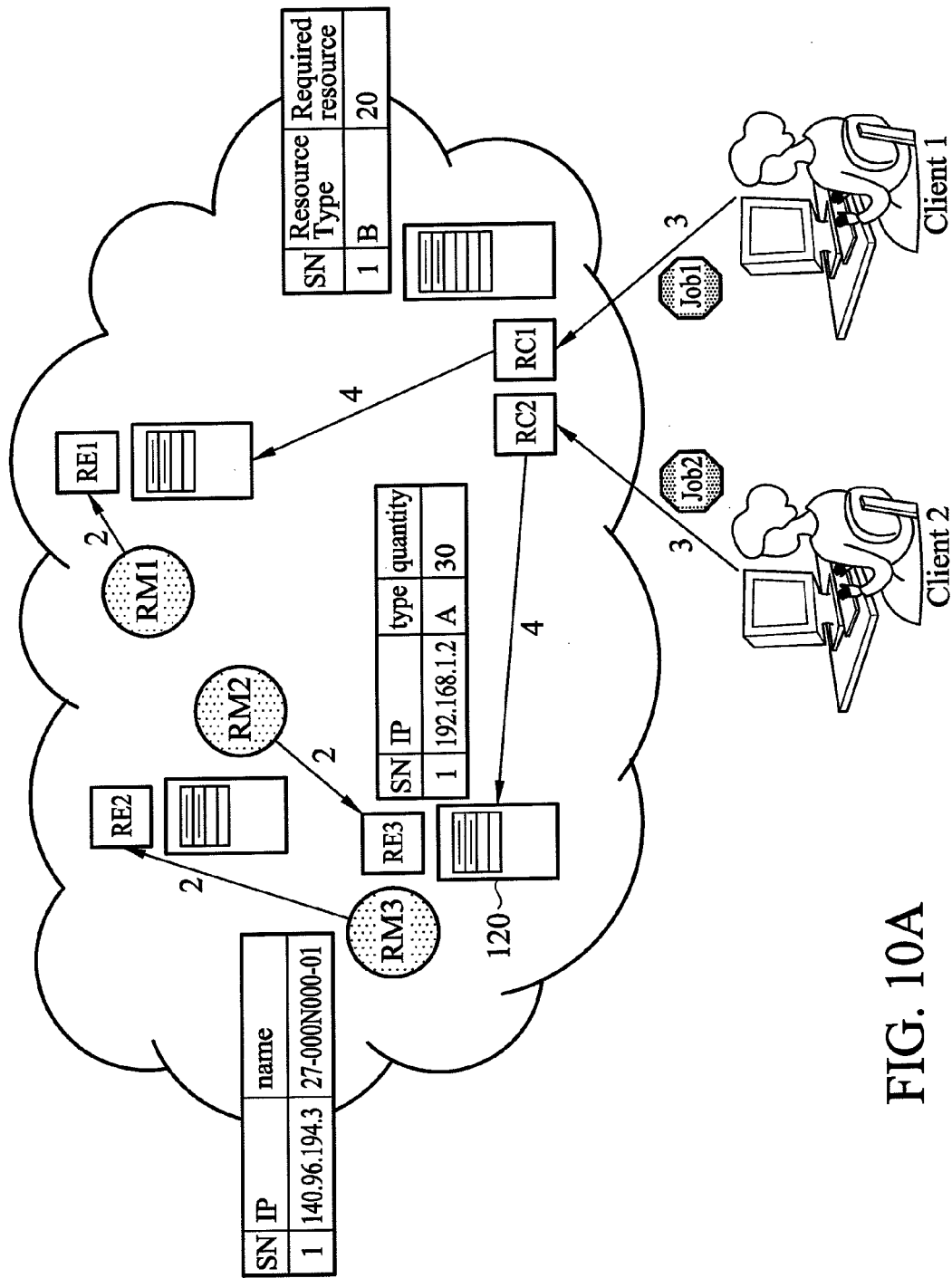
FIGS. 10A to 10C are schematic diagrams illustrating an embodiment of the distributed resource management operation of the invention.
Figures 10B, 10C:
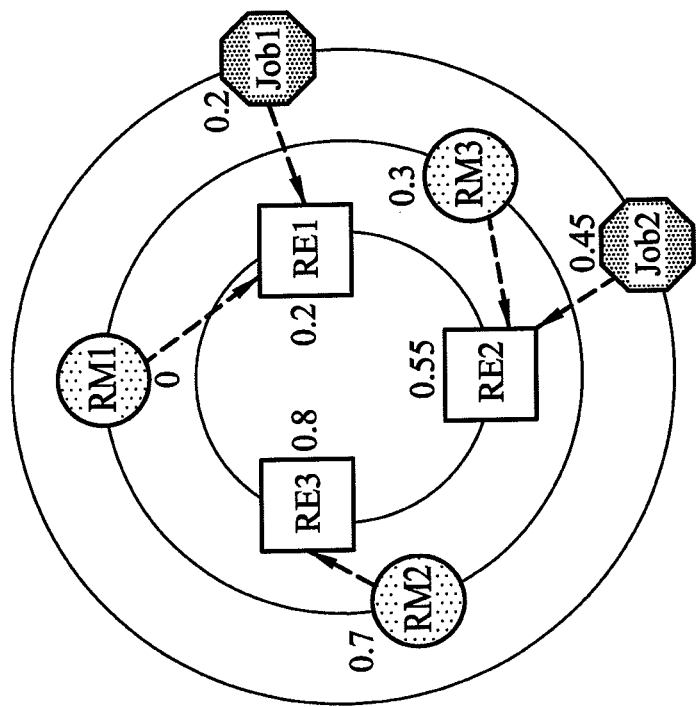

FIGS. 10A to 10C are schematic diagrams illustrating an embodiment of the distributed resource management operation of the invention, wherein FIG. 10A illustrates an example of the distributed calculation environment at the time point T1, FIG. 10B illustrates an example of a responsive calculation result, and FIG. 10C illustrates an example of a responsive CDRG at time point T1. First, the system generates a DREG {0.2, 0.55, 0.8} and a DRMG {0, 0.3, 0.7} according to the resource tables and the identification tables of the RMs RM1, RM2 and RM3 respectively and sets up a relationship between the DREG and the DRMG based on a specific rule, wherein the RM1 manages the resource RE1, the RM3 manages the resource RE2 and the RM2 manages the resource RE3. When a first client (Client 1) and a second client (Client 2) respectively issue a job request Job1 and a job request Job2 at time point T1, the system generates the RRG {0.2, 0.45} and the CDRG, and assigns the RE1 to perform the job Job1 and the RE2 to perform the job Job2 according to the CDRG.

Figure 11A:
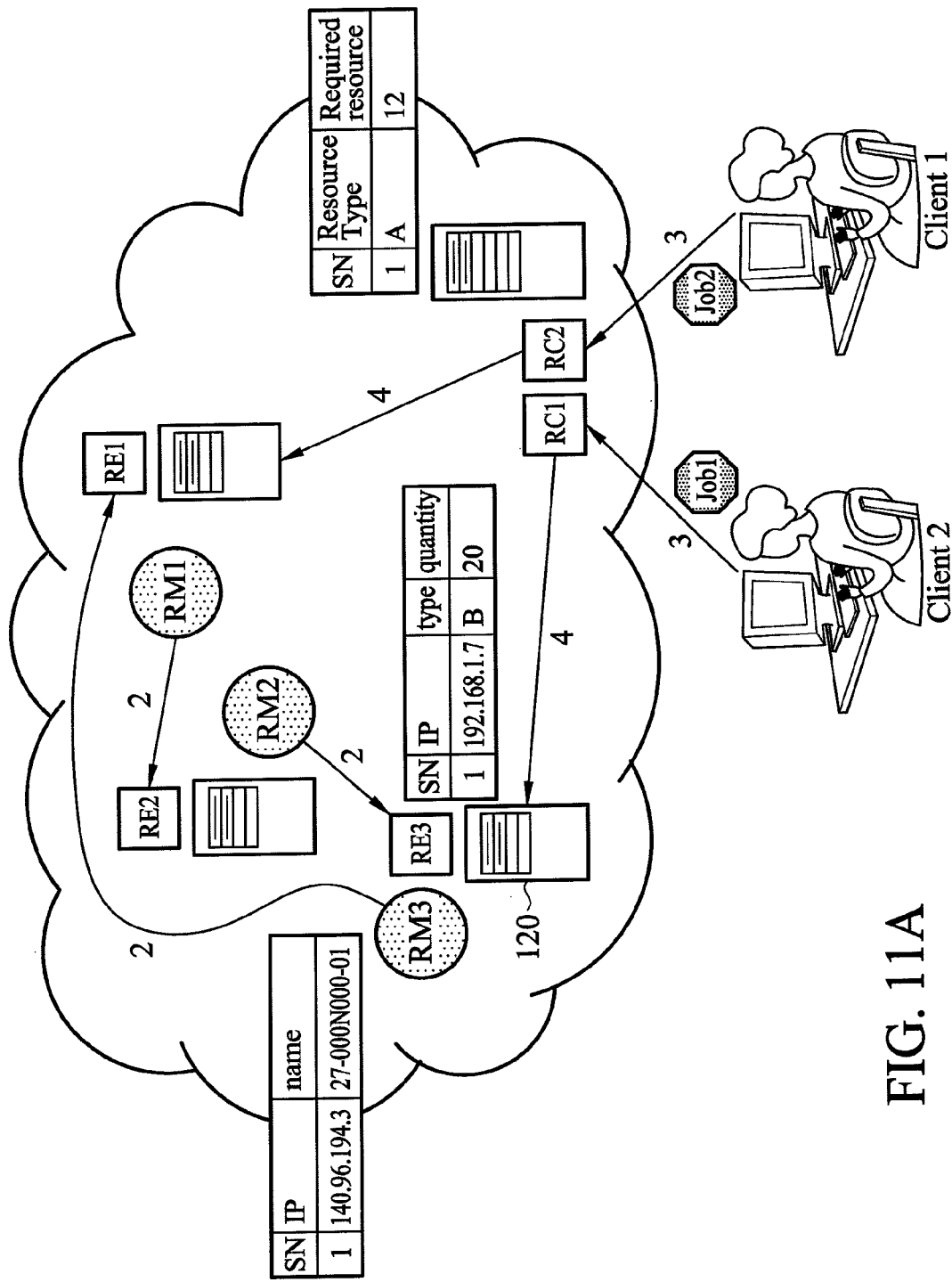
FIGS. 11A to 11C are schematic diagrams illustrating another embodiment of the distributed resource management operation of the invention.
Figures 11B, 11C:
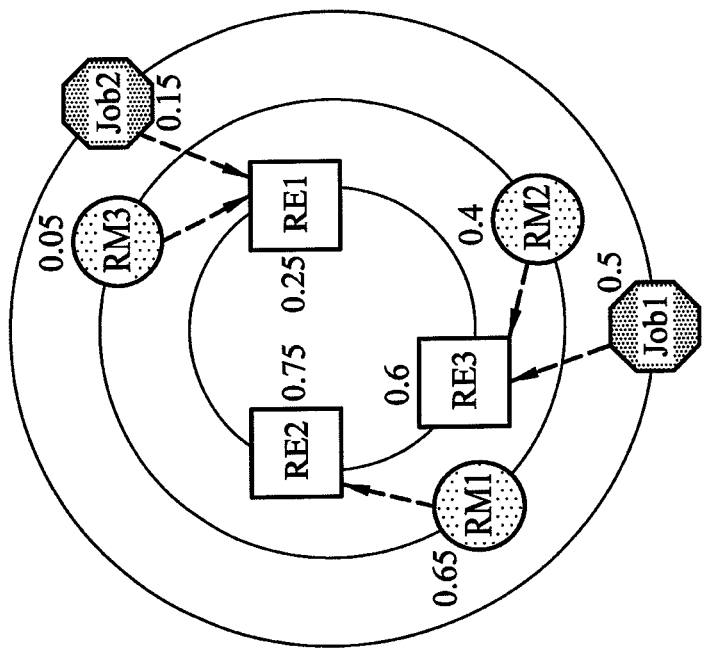

FIGS. 11A to 11C are schematic diagrams illustrating another embodiment of the distributed resource management operation of the invention, wherein FIG. 11A illustrates an example of the distributed calculation environment, FIG. 11B illustrates an example of a responsive calculation result, and FIG. 11C illustrates an example of a responsive CDRG at the time point T2 other than T1, respectively. First, at the time point T2, the system generates a new DREG {0.25, 0.6, 0.75} and a new DRMG {0.05, 0.4, 0.65} according to the resource tables and the identification tables of the RMs RM1, RM2 and RM3 respectively and sets up a relationship between the DREG and the DRMG based on the specific rule, wherein the RM3 manages the resource RE1, the RM2 manages the resource RE3 and the RM1 manages the resource RE2. When the first client Client 1 and the second client Client 2 respectively issue a job request Job2 and a job request Job1 at the time point T2, the system 100 generates the RRG {0.15, 0.5} and the CDRG, and assigns the RE1 to perform the job Job2 and the RE2 to perform the job Job1 according to the CDRG.

From the above-mentioned two embodiments, when looking at the change of the system from T1 to T2, it can be found that along with an increase or decrease of a systems physical computing resources, a computing volume of job execution requests may also change continuously. Further, as resources of operation nodes are different in different periods of time, generated hash functions are different so that generated DREGs and DRMGs are also different and as the volume of jobs to be performed may be large or small, generated RRGs are also different. Therefore, with the distributed resource management method of the present invention, proper resources can be rapidly found to perform the job so that an immediate job can be accomplished.

In sum, with the DRMS and related distributed resource management methods of the invention, multiple distributed RMs can autonomously estimate system resource statuses for dynamic design of hash functions and generate resource graphs, and determine resource allocation by use of the resource graphs so that proper resource entities can be rapidly found to accomplish the jobs through the distributed resource graph when the system needs to operate some jobs. Thus, it is possible that request reception and resource allocation can be made at anytime and anywhere to process the jobs immediately. Furthermore, with the management mechanism of the compound distributed resource graph of the present invention, more resource allocations and management can be simultaneously processed and each system RM can handle almost as many resources as others, for each time so that only related resource entities for satisfying resource request are needed to be locked. Thus, the volume of locked resources can be greatly reduced, rendering the distributed resource management system of the invention to be equipped with preferred scalability, wherein loadings among RMs are easier to be reached with a balanced status.

Methods for resource management of distributed resource management systems, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A distributed resource management (DRM) method for managing a plurality of resources of a distributed resource management system (DRMS), wherein the distributed resource management system at least comprises a plurality of resource managers (RMs) and a plurality of resource consumers (RCs), the method comprising:
    obtaining current usage information of the resources of the distributed resource management system by the RMs, wherein the resources are included in a plurality of resource entities (REs);
    generating a first distributed resource graph according to the current usage information of the resources;
    obtaining identification information of the RMs;
    generating a second distributed resource graph according to the identification information;
    obtaining resource expense information by the RCs regarding resource expenses required by a plurality of jobs;
    generating a third distributed resource graph according to the resource expense information;
    obtaining a compound distributed resource graph (CDRG) by combining the first, second, and third distributed resource graphs; and
    determining the jobs to be performed by a corresponding amount of the resources within the distributed resource management system according to the CDRG,
    wherein the CDRG is generated by graphically arranging the first, second and third distributed resource graphs in a specific sequence, wherein the first distributed resource graph arranges the REs in numerical order according to the current usage information of the corresponding resources and the second distributed resource graph arranges the RMs in numerical order according to the identification information, wherein the REs between two RMs are managed by the smaller one of the RMs therebetween and the third distributed resource graph arranges the resource requests in numerical order according to the resource expense information to find the RE which has available resources larger than that for the resource request to perform the requested job.

2. The distributed resource management method of claim 1, wherein the step of generating the first distributed resource graph according to the current usage information of the resources further comprises:
    sampling resource information included in a resource table to obtain a resource sampling set;
    generating a first hash function dynamically according to the resource sampling set;
    mapping each resource of the resource sampling set into the first hash function to obtain a first plurality of hash values;
    normalizing the first plurality of hash values to obtain a first plurality of normalized results; and
    sorting the resources in the resource sampling set in numerical order based on the first plurality of normalized results to obtain the first distributed resource graph.

3. The distributed resource management method of claim 1, wherein the step of generating the second distributed resource graph according to the identification information further comprises:
    sampling the identification information included in an identification table to obtain an identification data sampling set;
    generating a hash function dynamically according to the identification data sampling set;
    mapping each identification data of the identification data sampling set into the hash function to obtain a second plurality of hash values;
    normalizing the second plurality of hash values to obtain a second plurality of normalized results; and
    sorting the identification data in the identification data sampling set in numerical order based on the second plurality of normalized results to generate the second distributed resource graph.

4. The distributed resource management method of claim 1, wherein the step of generating the third distributed resource graph according to the resource expense information regarding resource expenses required by the jobs further comprises:
    sampling a plurality of request quantity information included in a request table to obtain a request quantity sampling set;
    generating a hash function dynamically according to the request quantity sampling set;
    mapping each request quantity information of the request quantity sampling set into the hash function to obtain a third plurality of hash values;
    normalizing the third plurality of hash values to obtain a third plurality of normalized results; and
    sorting the request quantity information in the request quantity sampling set in numerical order based on the third plurality of normalized results to obtain the third distributed resource graph.

5. The distributed resource management method of claim 1, wherein the RMs further utilize a resource monitor agent of the distributed resource management system for obtaining the current usage information of the resources of the distributed resource management system.

6. The distributed resource management method of claim 1, wherein the current usage information of the resources comprises at least one of the following: a resource identifier, a resource network location, a resource type, and available resources information.

7. The distributed resource management method of claim 1, wherein the RCs further utilize a resource request table for obtaining the resource expense information regarding resource expenses required by the jobs in the distributed resource management system.

8. The distributed resource management method of claim 1, wherein the resource expense information comprises at least one of a consumed resource type and a consumed resource quantity.

9. A hardware-implemented distributed resource management system, comprising:
a plurality of resource entities including a plurality of resources;
a plurality of hardware-implemented resource managers (RMs) for managing the resources of the resource entities, wherein the RMs obtain current usage information of the resources of the distributed resource management system to generate a first distributed resource graph and obtain identification information of the RMs to generate a second distributed resource graph;
a plurality of hardware-implemented resource consumers (RCs) for providing resource expense information regarding resource expenses required by a plurality of jobs to generate a third distributed resource graph; and
a compound distributed resource graph (CDRG) generated by combining the first, second, and third distributed resource graphs, determining the jobs to be performed by a corresponding amount of the resources within the distributed resource management system,
wherein the CDRG is generated by graphically arranging the first, second and third distributed resource graphs in a specific sequence, wherein the first distributed resource graph arranges the REs in numerical order according to the current usage information of the corresponding resources and the second distributed resource graph arranges the RMs in numerical order according to the identification information, wherein the REs between two RMs are managed by the smaller one of the RMs therebetween and the third distributed resource graph arranges the resource requests in numerical order according to the resource expense information to find the RE which has available resources larger than that for the resource request to perform the requested job.

10. The distributed resource management system of claim 9, wherein the RMs further sample resource information included in a resource table to obtain a resource sampling set, generate a first hash function dynamically according to the resource sampling set, map each resource of the resource sampling set into the first hash function to obtain a first plurality of hash values, normalize the first plurality of hash values to obtain a first plurality of normalized results, and sort the resources in the resource sampling set in numerical order based on the first plurality of normalized results to generate the first distributed resource graph.

11. The distributed resource management system of claim 9, wherein the RMs further sample identification information included in a identification table to obtain an identification data sampling set, generate a second hash function dynamically according to the identification data sampling set, map each identification data of the identification data sampling set into the second hash function to obtain a second plurality of hash values, normalize the second plurality of hash values to obtain a second plurality of normalized results, and sort the identification data in the identification data sampling set in numerical order based on the second plurality of normalized results to generate the second distributed resource graph.

12. The distributed resource management system of claim 9, wherein the RCs further sample request quantity information included in a request table to obtain a request quantity sampling set, generate a third hash function dynamically according to the request quantity sampling set, map each request quantity information of the request quantity sampling set into the third hash function to obtain a third plurality of hash values, normalize the third plurality of hash values to obtain a third plurality of normalized results, and sort the request quantity information in the request quantity sampling set in numerical order based on the third plurality of normalized results to generate the third distributed resource graph.

13. The distributed resource management system of claim 9, wherein the RMs further utilize a resource monitor agent of the distributed resource management system for obtaining the current usage information of the resources of the distributed resource management system.

14. The distributed resource management system of claim 9, wherein the current usage information of the resources comprises at least one of the following: a resource identifier, a resource network location, a resource type, and available resources information.

15. The distributed resource management system of claim 9, wherein the RCs further utilize a resource request table for obtaining the resource expense information regarding resource expenses required by the jobs in the distributed resource management system.

16. The distributed resource management system of claim 9, wherein the resource expense information comprises at least one of a consumed resource type and a consumed resource quantity.

* * * * *